US011457650B2

(12) United States Patent
Farina et al.

(10) Patent No.: US 11,457,650 B2
(45) Date of Patent: Oct. 4, 2022

(54) FORMULATION FOR PROMOTING TARGETED POLLINATION OF ALMOND TREE CROPS IN HONEY BEES

(71) Applicants: CONSEJO NACIONAL DE INVESTIGACIONES CIENTÍFICAS Y TÉCNICAS (CONICET), Ciudad Autónoma de Buenos Aires (AR); UNIVERSIDAD DE BUENOS AIRES, Ciudad Autónoma de Buenos Aires (AR)

(72) Inventors: Walter M. Farina, Ciudad Autónoma de Buenos Aires (AR); Maria Cecilia Estravis Barcala, Ciudad Autónoma de Buenos Aires (AR); Florencia Palottini, Ciudad Autónoma de Buenos Aires (AR)

(73) Assignees: CONSEJO NACIONAL DE INVESTIGACIONES CIENIIFICAS Y TECNICAS (CONICET), Ciudad Autonoma de Buenos Aires (AR); UNIVERSIDAD DE BUENOS AIRES, Ciudad Autonoma de Buenos Aires (AR)

( * ) Notice: Subject to any disclaimer, the term of this patent is extended or adjusted under 35 U.S.C. 154(b) by 392 days.

(21) Appl. No.: 16/634,041

(22) PCT Filed: Jul. 25, 2018

(86) PCT No.: PCT/IB2018/055549
§ 371 (c)(1),
(2) Date: Jan. 24, 2020

(87) PCT Pub. No.: WO2019/021209
PCT Pub. Date: Jan. 31, 2019

(65) Prior Publication Data
US 2020/0229464 A1    Jul. 23, 2020

(30) Foreign Application Priority Data

Jul. 26, 2017  (AR) .............................. 20170102101

(51) Int. Cl.
| | |
|---|---|
| A61K 36/00 | (2006.01) |
| A23K 20/105 | (2016.01) |
| A23K 20/163 | (2016.01) |
| A23K 50/90 | (2016.01) |
| A23K 20/111 | (2016.01) |
| A01G 7/00 | (2006.01) |
| A01K 53/00 | (2006.01) |
| A01N 27/00 | (2006.01) |
| A01N 31/02 | (2006.01) |
| A01N 31/04 | (2006.01) |

(52) U.S. Cl.
CPC .............. *A23K 20/105* (2016.05); *A01G 7/00* (2013.01); *A01K 53/00* (2013.01); *A01N 27/00* (2013.01); *A01N 31/02* (2013.01); *A01N 31/04* (2013.01); *A23K 20/111* (2016.05); *A23K 20/163* (2016.05); *A23K 50/90* (2016.05)

(58) Field of Classification Search
CPC ................................................... A23K 20/163
See application file for complete search history.

(56) References Cited

U.S. PATENT DOCUMENTS

| | | | |
|---|---|---|---|
| 6,177,070 B1 | 1/2001 | Lynch | |
| 2003/0044368 A1* | 3/2003 | Tsuchikura | A61Q 19/00 560/155 |

FOREIGN PATENT DOCUMENTS

| | | |
|---|---|---|
| EP | 2 169 046 A1 | 3/2010 |
| JP | 2008-212148 A | 9/2008 |
| KR | 10-0687624 B1 | 2/2007 |
| KR | 10-2010-0047030 A | 5/2010 |
| KR | 10-2011-0042524 A | 4/2011 |
| KR | 10-2012-0140686 A | 12/2012 |
| KR | 10-2015-0056185 A | 5/2015 |
| WO | WO-2013005200 A1 * | 1/2013 ............. A01N 27/00 |

OTHER PUBLICATIONS

Anonymous, "Eco Bio Systems! | Eco Bio Systems—Ökologische Betriebsmittel |—Bestäubung | Pollinusr 1 Liter", Jan. 1, 2001 (Jan. 1, 2001), <URL:https://www.eco-bio-systems.de/index.php/de/Pollinus-1-Liter/c-KAT145/a-P00780> (XP-055512894) (with English machine translation).

* cited by examiner

*Primary Examiner* — Qiuwen Mi
(74) *Attorney, Agent, or Firm* — Muncy, Geissler, Olds & Lowe, P.C.

(57) ABSTRACT

A formulation and a composition that comprises it for promoting the pollination of almond tree crops (*Prunus dulcis*) by biasing the foraging preferences of the honey bee (*Apis mellifera*). The formulation comprises the compounds limonene, linalool and benzaldehyde. Additionally, a method for targeting the bees' pollinizing activity towards the almond tree crops by using the formulation comprising the compounds limonene, linalool and benzaldehyde.

16 Claims, 11 Drawing Sheets

FORMULATION FOR PROMOTING TARGETED POLLINATION OF ALMOND TREE CROPS IN HONEY BEES

The present disclosure relates to a formulation and compound that promotes the pollination of almond tree crops (*Prunus dulcis*) by biasing the foraging preferences of the honey bee (*Apis mellifera*). It also relates to a method for targeting the pollination activity of the bees towards almond tree crops.

BACKGROUND OF THE INVENTION

Among honey bees, odors play an important role in the search and selection of their nourishment sources. It is widely known that bees control the collection of resources not only according to innate search images, but also according to experiences previously acquired in the field as well as in the social environment of the hive (Ribbands C R (1955) *The scent language of honey bees; Ann Rev Smithson Inst* 368-377; von Frisch K (1967) *The dance language and orientation of bees; Harvard University Press*, Cambridge, Mass.). In this sense, the olfactory memories established in the field based on floral odors and their nectar may be retrieved (evoked) with the presentation of this floral scent inside the hive (Ribbands C R (1954) *Communication between honeybees: the response of crop-attached bees to the scent of their crop; Proc R Entomol Soc Lond A* 29:141-144; Johnson D L & Wenner A M (1966) *A relationship between conditioning and communication in honeybees; Anim Behav* 14:261-265; Jakobsen H B & col., (1995) *Can social bees be influenced to choose a specific feeding station by adding the scent of the station to the hive air? J Chem Ecol* 21(11):1635-1648; Reinhard J & col., (2004) *Floral scents induce recall of navigational and visual memories in honeybees. J Exp Biol* 207:4371-4381). Furthermore, the consumption of scented food retrieved by foragers and brought into the hive can produce a bias in the collecting preferences of their nestmates (von Frisch K (1923) *Über die Sprache der Bienen; Zool Jb Physiol* 40:1-186; Wenner A M & col. (1969) *Honey bee recruitment to food sources: olfaction or language? Science* 164:84-86; Dornhaus A, Chittka L (1999) *Evolutionary origins of bee dances; Nature* 401:38).

During foraging in scented feeding stations, hive members may learn these odors if they remain impregnated in the foragers' bodies (von Frisch K (1967) *The dance language and orientation of bees; Harvard University*) and/or if small samples of scented food are transferred mouth-to-mouth between hive members (trophallaxis) (Farina, W M & col. (2007) *Honeybees learn floral odors while receiving nectar from foragers within the hive; Naturwissenschaften,* 94:55-60).

Furthermore, it has been demonstrated that scented food retrieved by foragers and moved around the hive may affect the behavior of young bees that are not yet involved in foraging tasks (Grüter C y col. (2006) *Propagation of olfactory information within the honeybee hive. Behav Ecol Sociobiol* 60:707-71; Grüter C & col. (2009). *Retention of long-term memories in different age-groups of honeybee (Apis mellifera) workers. Insectes Sociaux*, DOI 10.1007/s00040-009-0034-0).

The inventors of the present disclosure have previously published results suggesting that bees may develop olfactory memories inside the hive during the distribution of scented food. Such memories may be retrieved (evoked) days after the fact and outside the hive, which is evidenced by the bias in the foraging preferences. The establishment of these memories depends on neither the recruiting mechanisms commonly found in hives, nor on the presence of scented food reserves that enable the retrieval of the previously acquired memories (Arenas A & col., (2007). *Floral odor learning within the hive affects honeybees' foraging decisions. Naturwissenschaften,* 94:218-222).

In "*Floral odor learning within the hive affects honeybees' foraging decisions*", published in Naturwissenschaften, 94:218-222, Arenas A & col., it is furthermore disclosed that the odor of food that is available "inside the beehive" produces long-term olfactory memories that affect the behavior for selecting food sources outside the hive. It is also disclosed that, in order to develop long-term memories of a specific floral (pure) odor, such odor should be dissolved in a sugar solution (e.g. sucrose solution 50% w/w), which can be made available in a feeder located inside the hive (a common procedure used in apiculture). The pure odor should be diluted in the sugar solution in minimal quantities (concentration: 50 μl of odor per 1 L of sugar solution available).

In "*Floral scents affect the distribution of hive bees around dancers*", *Behavioral Ecology and Sociobiology* (2007) 61:1589-1597, Jul. 4, 2007, Diaz, Paula C. & col., it is disclosed that the floral odor impregnated in the body of a bee returning from a flower attracts nestmates at the time of engaging in the "dance of the bee", a mechanism used by this species to recruit other bees towards food sources inside the hive, besides from increasing the incidence of food samples transfer taking place via mouth-to-mouth contact or trophallaxis.

Lastly, in "*Floral scents experienced within the colony affect long-term foraging preferences in honeybees*", *Apidologie* 39:714-722, 2008, Arenas A & col., it is disclosed that the factor increasing the number of landings on a food source with a specific odor is the odor of the food moving around the hive and not the exposure to that same odorant as volatile. Furthermore, in "*Passive volatile exposure within the honeybee hive and its effect on odor discrimination*", *Journal of Comparative Physiology A,* 195:759-768, 2009, Fernández V & col., it is disclosed that the exposure to a floral odor as volatile "inside the hive" hinders learning of those floral odors in subsequent trainings. This suggests that those odors exposed as volatilized compounds inside the hive will not be preferred if they are present in a natural floral fragrance, even when these specific flowers offer abundant nectar as resource.

Many crops require pollination by insects that favor cross-fertilization by visiting different flowers of the same species. Particularly, *Apis mellifera* is the most abundant pollinator in single-crop farming around the world, and is considered to be of very high importance to increase the yield of seed and fruit.

In some countries leading the world ranking in honey production, as is the case of Argentina, apiculture is essentially understood as a means to obtain the produce stockpiled in the beehive (honey, propolis or bee glue, and royal jelly, etc.). Nonetheless, the use of the honey bee as a crop pollinizing agent is generally somewhat underdeveloped in comparison with other countries where it enjoys a greater importance, i.e. the United States and France. Nevertheless, in parallel with the advances in monocultures or single-crop farming, a growing demand arises in search of increasing targeted and sustainable pollination services for these crops.

The main problem to be addressed in targeted pollination relates to the change in floral availability when displacing hives from one environment which is familiar to the foragers to another unfamiliar location. In an unfamiliar environment, honey bees lack any reliable and updated information that can be evoked during foraging.

In practice, it is observed that after transhumance (beehive displacement) the foragers remain relatively idle during the first days, and do not immediately visit the desired flowers, even when these offer substantial rewards. This occurs due to the fact that the recently introduced bees lack previous experiences related to the target crop; thus, no previously established memories exist to guide or enable localization of this floral species. During a variable period (that can carry on for several days) the bees develop new floral scent-nectar associations (memories) and update the information that allows them to locate new floral species available in the environment.

Two products available in the market, POLLINUS® and BEE SCENT®, are similar to a bee pheromone and their presence on floral sites attracts new honey bee foragers. Their use involves spraying of a crop (whatever its type) with the product, which can be efficient in reduced spaces (such as little orchards and greenhouses) but not over wide field surfaces. This would require several product sprayings, which would render the practice overly costly and hardly efficient for extensive crops. While these products act directly as bee attractants (although they might as well attract other insects), they lack specificity for a particular floral species, and due to their nature, they could interfere directly with other behaviors of the bees. None of these products is based on floral odors linked to appetite nor do they involve the bees' olfactory memory.

Patent application CN102823628 (A) discloses a composition to attract bees to soy crops and its method of use, wherein the attracting composition is sprayed over the soy crop to promote its pollination, and therefore increase production.

An alternative strategy is to "train" the bees so that they acquire a preference to collect pollen from a particular species of flower, in order to promote its pollination. This strategy was implemented in the '30s by beekeepers of Germany and ex-USSR countries, who used this method to stimulate beehives with natural scents, particularly by grinding flowers [(von Frisch, K. (1943), *Versuche über die Lenkung des Bienenfluges durch Duftstoffe*. Naturwissenschaften 31, 445-460]. The disadvantage of this methodology is that industrial scale production of scents via this procedure is not efficient, and requires the destruction of flowers belonging to the target species. Moreover, scents produced via the grinding of flowers are unstable and do not easily resist storage.

Patent application CN 101569286 (A) discloses compositions and methods to promote pollination by bees of sterile plant parental lines. The composition comprises secondary metabolites of flowers such as common alkaloids (i.e. nicotine and caffeine) and water-soluble phenols (i.e. flavonoids, quercetin, gallic acid and caffeic acid). The method consists of placing the beehives inside tents where target plants grow. The bees are then fed with the composition that comprises the secondary metabolites in a certain timeline, and feeding continues until flowering stage ends, at which point the bees are removed from the tent. This method and composition are not targeted to any particular plant species, and are not useful for crops in large-scale farming, such as the almond tree.

Patent application JP 2008212148 "Method for promoting pollination of plant including induction of flower bee to floral organ of specific plant by taking advantage of floral fragrance component of flower organ of this plant" describes a composition of floral fragrances to promote pollination of plants by bees. Nonetheless, this patent application does not describe a composition that simulates the almond tree floral odor in a specific manner, nor that is useful to target the bees' pollination activity towards almond tree crops. Neither can a compound of such characteristics be derived from the disclosures of application JP2008212148.

Patent application WO 2013/005200 (A1) discloses a composition to promote pollination of apple crops (*Malus silvestris*) by causing a bias in the honey bees' foraging preferences, and its method of use. The composition comprises the compounds citral, benzaldehyde and limonene. By being specific to apple crops, the composition is not useful to promote pollination to almond tree crops.

Patent application WO 2013/005199 (A1) discloses a composition to promote pollination of sunflower crops (*Helianthus annuus*) by causing a bias in the honey bees' foraging preferences. The composition comprises the compounds sabinene, ß-pinene and limonene. By being specific to sunflower crops, the composition is not useful to promote pollination to almond tree crops.

Therefore, the need arises for effective and stable compositions that promote pollination of almond tree crops, and can also be produced in a simple and cost-effective manner, on an industrial scale, as well as methods for promoting the pollination of almond tree crops by the honey bee (*Apis mellifera*).

BRIEF DESCRIPTION OF THE INVENTION

It is therefore an object of the present disclosure to provide compositions that simulate the almond tree floral odor in order to generate specific olfactory memories in bees from hives that shall be located in almond tree crops to promote their pollination. The memories established after stimulation with the present formulation decrease the time during which bees remain idle until the beginning of foraging. The composition of the invention stimulates the collection of resources by promoting a faster and constant foraging activity on the crop. The use of the invention decreases the time needed for the beehives to remain in the crops, as well as the number of required beehives. Additionally, the use of the composition improves the health conditions in the beehives and increases their population. On the other hand, the composition of the invention has a very low cost and does not require the use of sophisticated techniques for its implementation.

According to a first aspect, the present invention relates to a formulation for promoting the targeted pollination of almond tree crops by honey bees, comprising the compounds limonene, linalool and benzaldehyde.

In one embodiment, the formulation of the invention comprises 49.5% to 60.5% limonene, 25% to 35% linalool, and 10% to 20% benzaldehyde. In one specific embodiment, the formulation of the invention comprises 50% to 60% limonene, 27% to 33% linalool, and 13.5% to 16.5% benzaldehyde. In an even further specific embodiment, the formulation of the invention that simulates the almond floral odor comprises 55% limonene, 30% linalool, and 15% benzaldehyde.

According to another aspect, the present invention provides a composition for promoting the targeted pollination of almond tree crops by honey bees, comprising the formulation of the invention diluted in a sugar solution, In a preferred embodiment of the composition of the invention, the sugar solution is an aqueous sucrose solution, more preferably a 50% w/w sucrose solution. In a more specific embodiment, the composition of the invention comprises 0.1 ml to 0.2 ml of the formulation according to the invention per 1 L of 50% w/w aqueous sucrose solution. In an even further specific embodiment, the composition of the invention comprises 0.1 ml to 0.2 ml of a formulation comprising 55% limonene, 30% linalool and 15% benzaldehyde per 1 L of 50% w/w aqueous sucrose solution.

According to another aspect, the present invention provides a method for promoting the targeted pollination of almond tree crops by honey bees, comprising the following steps:
 a) applying composition of the invention to the beehives;
 b) keeping the beehives in or in the immediate vicinity of the almond tree crops, whose pollination can be promoted until the end of flowering; and
 c) removing the beehives.

According to one particular embodiment of the method of the invention, step a) is executed via an artificial feeder located inside the beehive.

According to another particular embodiment of the method of the invention, step a) takes place within 2 days before placing the beehives in the crops, the pollination of which is sought to be promoted.

According to an additional particular embodiment of the method of the invention, step a) is executed after the placement of the beehives in the crops, the pollination of which is sought to be promoted.

According to an additional particular embodiment of the method of the invention, step a) is executed before the crop's flowering level reaches 20%.

According to an additional particular embodiment of the method of the invention, the composition is administered to the beehives a second time during step b).

DETAILED DESCRIPTION OF THE INVENTION

Figure 1:
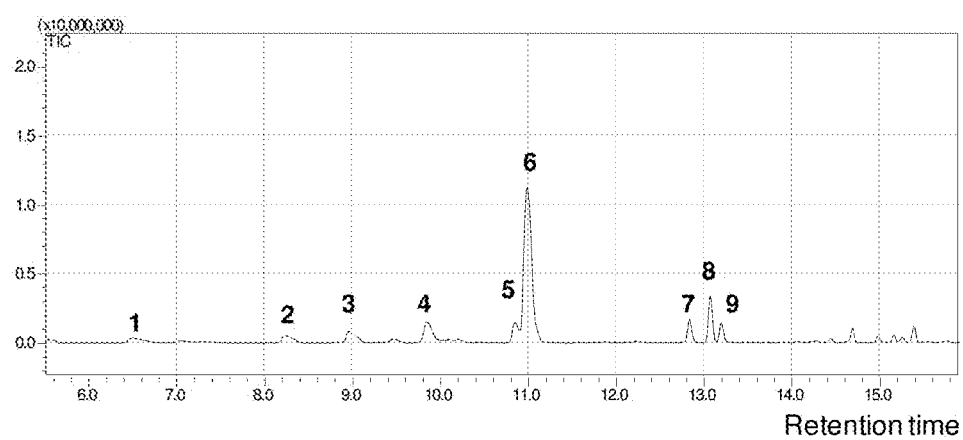
FIG. 1. Profile of volatile compounds present in the almond flower identified with SPME-GC-MS. The numbered peaks in the chromatogram relate to the compounds identified in Table 1 (see Example 1).
Figure 2:
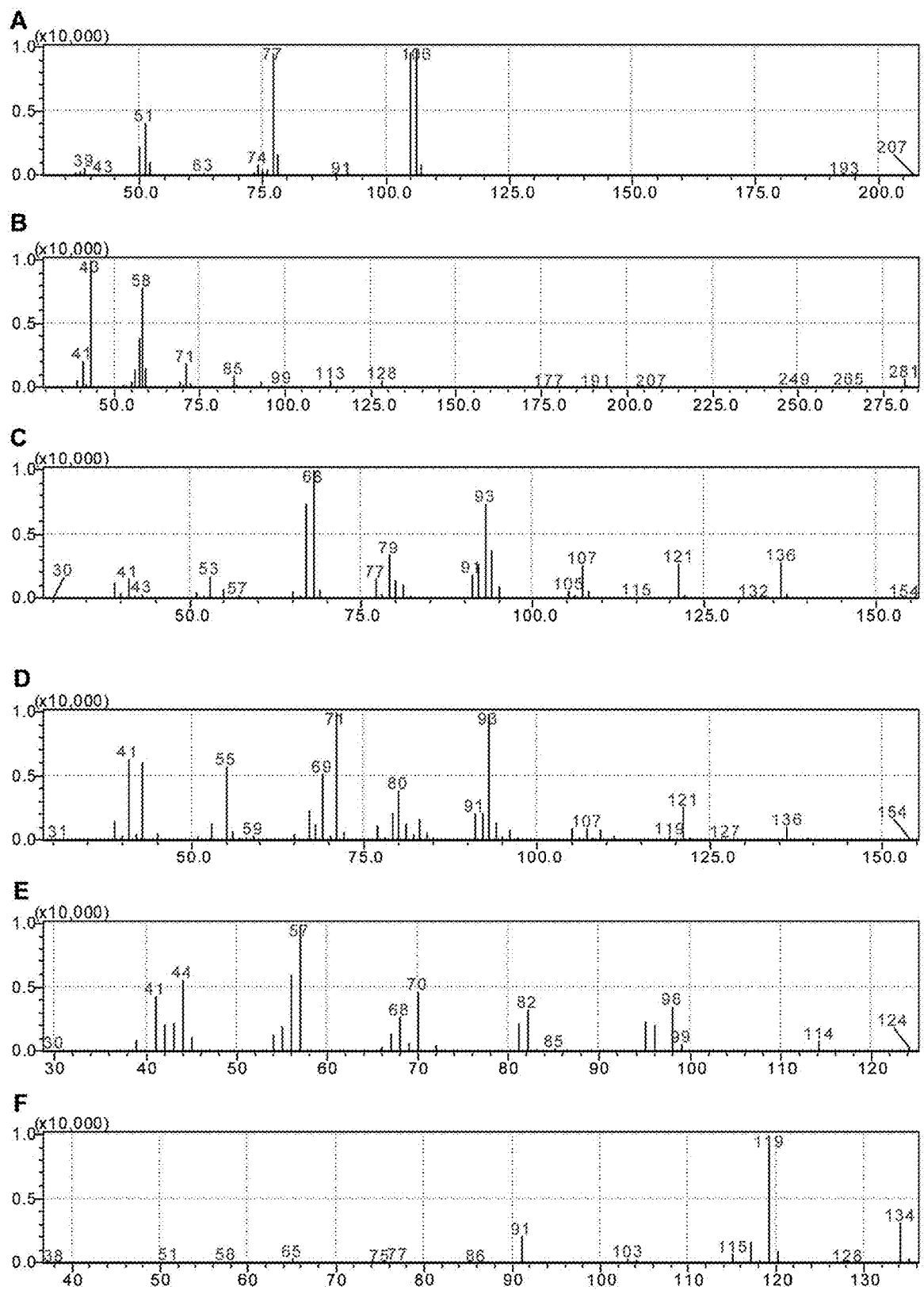
FIG. 2. Profile of volatile compounds of the almond flower identified with mass-spectrometry. A) Mass-spectrum corresponding to the peak with a retention time of 6.5 minutes, identified as 1-hexanol (95% similarity according to library NIST08s). B) Mass-spectrum corresponding to the peak with a retention time of 8.24 minutes, identified as α-pinene (96% similarity according to said library). C) Mass-spectrum corresponding to the peak with a retention time of 8.96 minutes, identified as benzaldehyde (98% similarity according to said library). D) Mass-spectrum corresponding to the peak with a retention time of 9.84 minutes, identified as 2-octanone (90% similarity according to said library). E) Mass-spectrum corresponding to the peak with a retention time of 10.8 minutes, identified as o-cymene (91% similarity according to said library). F) Mass-spectrum corresponding to the peak with a retention time of 10.98 minutes, identified as limonene (94% similarity according to said library). G) Mass-spectrum corresponding to the peak with a retention time of 12.8 minutes, identified as 2-nonanone (97% similarity according to said library). H) Mass-spectrum corresponding to the peak with a retention time of 13.07 minutes, identified as linalool (95% similarity according to said library). I) Mass-spectrum corresponding to the peak with a retention time of 13.19 minutes, identified as nonanal (90% similarity according to said library).
Figure 2:
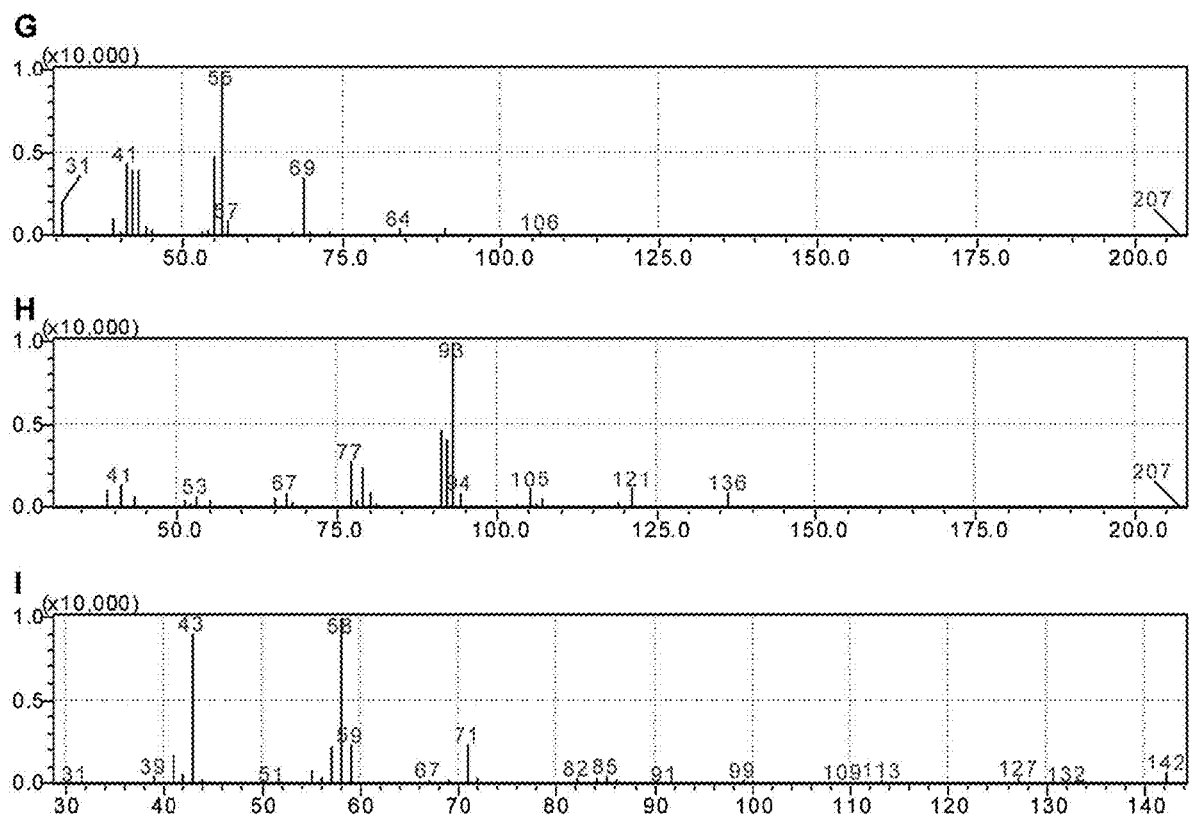

In recent years, pollination of almond tree crops using honey bee hives has gained significant relevance due to the greater increases in the resulting fruit yield.

The presence of honey bee hives in the vicinity of almond trees since the beginning of the flowering stage causes a greater number of fertilized flowers, and therefore a greater fruit setting, which in turn derived in a greater number of harvested fruits.

For these reasons, almond producers hire pollination services from apiarists specialized in beehive transhumance, renting a certain number of hives during blooming period. In this context, and due to the fact that apiarists usually stimulate their hives with sugar solutions, the application of a composition containing an almond floral synthetic formulation does not represent a significant modification in the usual apiarist practices. When apiarists relocate their hives during this period, bees from these colonies show delays before starting to visit novel flowers. As a consequence, being able to develop "memories of a synthetic formulation that simulates the almond floral fragrance" inside the beehives would enable a reduction in such delays, besides from making pollination more efficient.

It is therefore an object of the present invention to provide a formulation that simulates the almond natural floral odor in order to cause bees to immediately start foraging on almond tree crops. Such formulation comprises the compounds limonene, linalool and benzaldehyde. Particularly, this formulation acts by increasing the bees' foraging activity, attracting them specifically to almond flowers, promoting pollination and, as a result, increasing the crops' yield.

Although the relative composition of the limonene, linalool and benzaldehyde compounds in the formulation of the invention may vary, provided that all three of them are present, it is preferred that limonene is the most abundant compound, followed by linalool, benzaldehyde being the least abundant compound in the formulation. The inventors have further determined the optimal proportions for the components of the formulation of the invention. Nonetheless, the expert in the field shall note that these values may vary within certain margins without decreasing their efficiency, preferably in approximately ±10% of their relative percentage. Preferably, limonene is present in a percentage of 49.5% to 60.5%, such as 50% to 60%. Preferably, linalool is present in a percentage of 25% to 35%, such as 27% to 33%. Preferably, benzaldehyde is present in a percentage of 10% to 20%, such as 13.5% to 16.5%. In a preferable embodiment of the invention, the formulation simulating the almond floral odor comprises 55% limonene, 30% linalool, and 15% benzaldehyde. Additionally, according to the present application the terms "limonene", "linalool" and "benzaldehyde" comprise such compounds per se as well as their derivatives, polymorphs, hydrates, solvates, etc.

Surprisingly, the inventors have found that although the formulation of the invention combines only three out of the nine main volatile compounds identified in the almond floral extract (see Example 1), bees cannot differentiate the scent of the almond natural flower from the formulation of the invention. This is particularly unexpected taking into account that two of the three compounds (linalool and benzaldehyde) are $3^{rd}$ and $5^{th}$ in terms of percentage abundance within the almond floral extract. Moreover, the relative percentages of limonene, linalool and benzaldehyde in the preferred embodiment of the formulation of the invention differ significantly from their relative percentage abundance in the floral extract (55%-30%-15% in the formulation vs. 80%-13%-7% in the floral extract, respectively).

Even more surprisingly, the formulation of the invention shows a better performance than other volatile compounds combination present in the almond flowers that were expected a priori to show better results. In fact, as demonstrated in Example 2, the formulation of the invention has a better performance than similar formulations each comprising an additional component. The expert in the field would have expected the latter to be more effective than the formulation of the invention.

Additionally, the field tests also show that beehives fed with a composition comprising the formulation of the invention, which is also an object of the present application, begin foraging activity earlier and in a more prolonged manner than control hives.

According to the method of the invention, the formulation of the invention can be added to the beehive before or during the hive's placement in the almond tree crops, using common methodologies already known to apiarists. The formulation of the invention can be introduced in the beehive as part of a composition, which is also an object of the present application, wherein the formulation is diluted in a concentration of 0.1 to 0.2 ml per 1 L of 50% w/w aqueous sugar solution (e.g. sucrose solution). Even more preferably, the composition of the invention comprises 0.1 to 0.2 ml of a formulation comprising 55% limonene, 30% linalool and 15% benzaldehyde, diluted in a sucrose solution 50% w/w. The composition of the invention promotes targeted pollination of almond tree crops by honey bees.

For the purposes of the present invention, the abbreviation "w/w" refers to the relation between the solute weight and the total solution weight.

As to the way of administering it to the beehive, the formulation (i.e. as a part of a composition as described herein) can be placed via an artificial feeder inside the hive, or directly by pouring 500 to 1000 ml of the sugar composition over the beehive frames. Eventually, a second administration can be carried out depending on the state of the crop and hives. Particularly, when the blooming is very prolonged, a second administration can be done optionally to obtain better results.

The addition of the formulation of the invention, combined with sugar syrup before or during the placement of the beehives in the almond tree crops promotes quick and sustained foraging activity on the target crop, as well as an increase in foraging activity. This simple stimulation method enables the pollination of the almond tree crops and requires a smaller number of beehives to be used. On the other hand, the formulation of the invention has low production and commercialization costs.

In contrast to commercial products POLLINUS® and BEE SCENT®, which generate innate responses in the behavior of the bees, the formulation of the invention does not induce such "rigid" responses (which can be counter-productive in cases where the same beehives are moved from one crop to a different one). On the contrary, it influences the decision-making processes that are adaptable and can be adjusted according to the needs of each beehive or to the changing environment conditions. This proves to be essential when attempting to carry out integrated apicultural and agricultural management, without damage for any of the parties involved.

Therefore, the formulation of the invention can be used in small amounts to stimulate the beehives. Moreover, it is a simple formulation, comprising only three of the many volatile compounds that constitute the almond floral fragrance, resulting in a cost-effective product, which is simple to manufacture and easy to use. Moreover, the formulation stimulates the immediate foraging of honey bees on almond tree crops. Stimulation via administering the formulation or the composition of the invention can take place before taking the beehives to the crop or even before the beginning of the almond blooming.

EXAMPLES

Example 1: Identification and Quantification of Volatile Compounds in Almond Flowers For identification and quantification of volatile compounds present in almond flowers, the following protocol was used:
An almond tree branch was selected having 20-30 fresh flowers in the following stages: "bud" and "one-day-old flower". Together with an exposed SPME fiber (solid phase microextraction) (PDMS type, Supelco®), this branch was isolated using a polyethylene bag, in order to collect the volatiles present in the flowers for a period of 2 hours. Afterwards, the fiber was desorbed in a Shimadzu QP-2010 GC-MS device, in the following conditions: Splitless mode, with helium as carrier gas, injector temperature at 250° C. and interphase temperature at 310° C. The used temperature ramp was: 40 (1)-5-200-15-300 (1); and the column: AT-5 (diameter=0.25 mm, longitude=30 m, film=0.25 mm, flow=1 ml/min).

For later analysis of the runs and identification of present compounds, NIST05, NIST08 and SHIM2205 libraries were used.

Table 1 shows retention time and peak areas for the 9 identified main compounds.

| Peak N° | Retention time (min) | Peak area | Identified compound |
|---|---|---|---|
| 1 | 6.501 | 1.31 | 1-hexanol |
| 2 | 8.242 | 1.34 | α-pinene |
| 3 | 8.936 | 1.94 | Benzaldehyde |
| 4 | 9.843 | 3.35 | 2-octanone |
| 5 | 10.845 | 2.10 | o-cymene |
| 6 | 10.983 | 20.70 | Limonene |
| 7 | 12.831 | 1.81 | 2-nonanone |
| 8 | 13.068 | 3.31 | Linalool |
| 9 | 13.193 | 1.67 | Nonanal |

Example 2: Preparation of Formulations 3 different mixtures were prepared, each combining between 3 and 4 of the volatile compounds identified in Example 1. The composition of each mixture was:
  Mixture I: 50% limonene, 30% linalool, 10% benzaldehyde, 10% Nonanaldehyde.
  Mixture II: 50% limonene, 30% linalool, 10% benzaldehyde and 10% 2-octanone.
  Mixture III (formulation of the invention): 55% limonene, 30% linalool and 15% benzaldehyde.
In all cases, pure compounds (Sigma-Aldrich®) with over 95% purity were used. The solutions were prepared at room temperature by combining the compounds without the use of solvents. Once prepared, the mixtures were immediately used in experimentation and stored at 2° C.-8° C. until the end of the assays (4 days).

Example 3: Evaluation of Mixtures Through Differential Olfactory Conditioning

A differential olfactory conditioning was executed to evaluate the bees' ability to differentiate various scents from the almond natural floral odor. For each scent, 32 to 46 bees were used. Each bee used in the assay was harnessed and presented with the scent associated with a reward (Rewarded-conditioned Stimulus, EC+), and also presented with the almond natural floral odor without a reward (Unrewarded-conditioned Stimulus, EC−). Both stimuli were presented to the bee via a device that delivers the scents through a continuous air stream. A filter paper (30 mm×3 mm) was impregnated with each mixture (4 µl) and introduced in a syringe. On the other hand, fresh flowers from almond trees were placed in a Büchner flask (500 ml) connected to the mentioned device through cannulae. This conditioning was repeated 4 times, with a 15-minute separation between each paired scent presentations, in a pseudo-randomized order. The evaluated scents (EC+) were: A) Mixture 3 from Example 2 (Formulation), B) synthetic jasmine fragrance (Pfeiffer-Gerhards Keramik—Germany), C) Mixture 1 from Example 2, and D) Mixture 2 of Example 2. In all cases, the unrewarded control (EC−) was the almond natural floral odor. The ability to differentiate EC+ from EC− was evaluated based on the bees' proboscis extension response (PER) (testing phase towards two novel and unrewarded stimuli).

Figure 3:
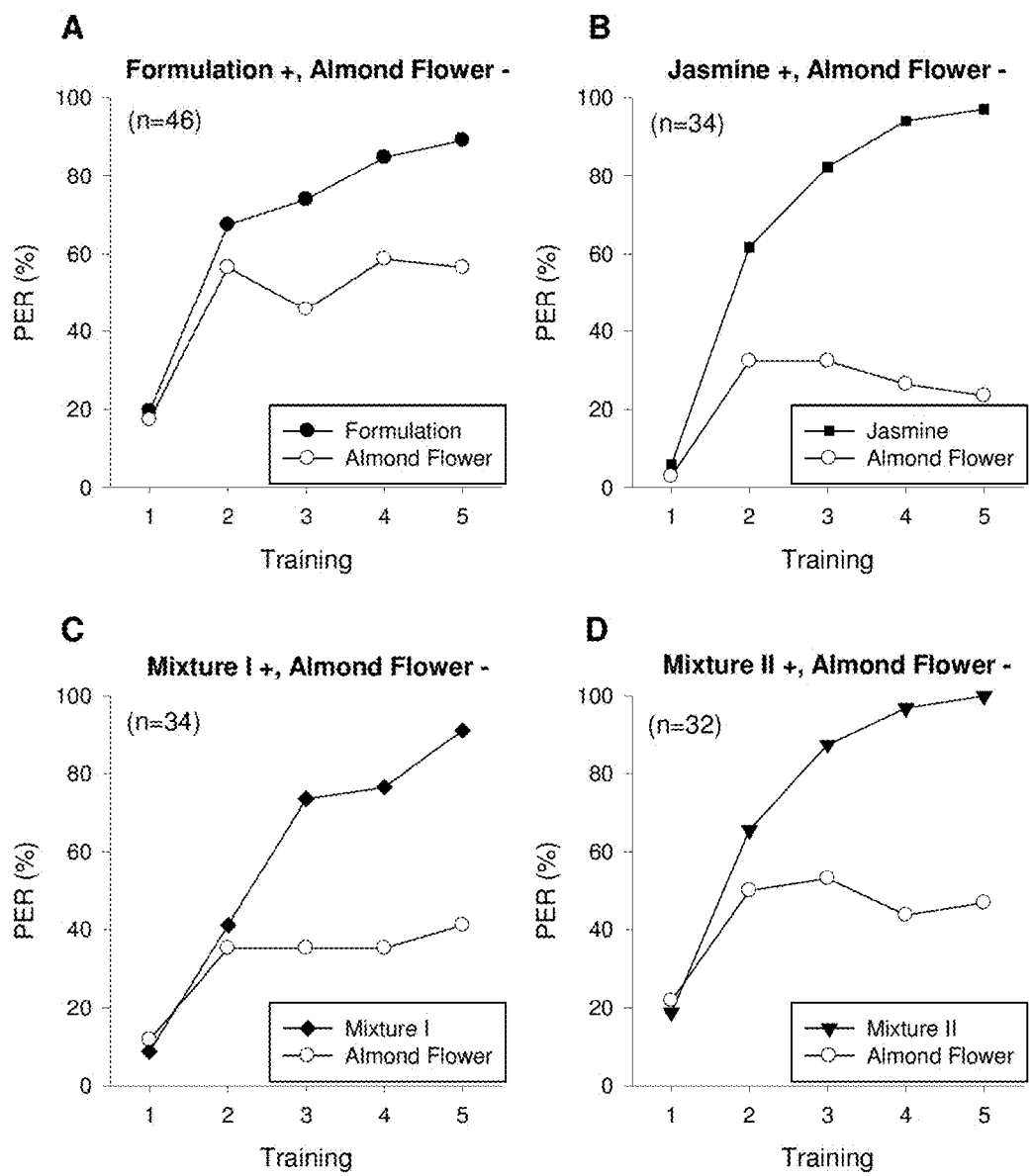
FIG. 3. Bees' ability to differentiate the almond natural floral odor from different scents in the proboscis extension response (PER) setup. A-C: Bees' behavior upon exposure to the almond natural floral odor vs.: A, the formulation of the invention (Formulation); B, jasmine fragrance; C, Mixture I); D, Mixture II); E: Olfactory Generalization Index for each different mixture. Each different letter indicates significant differences in a Kruskal-Wallis test.
Figure 3:
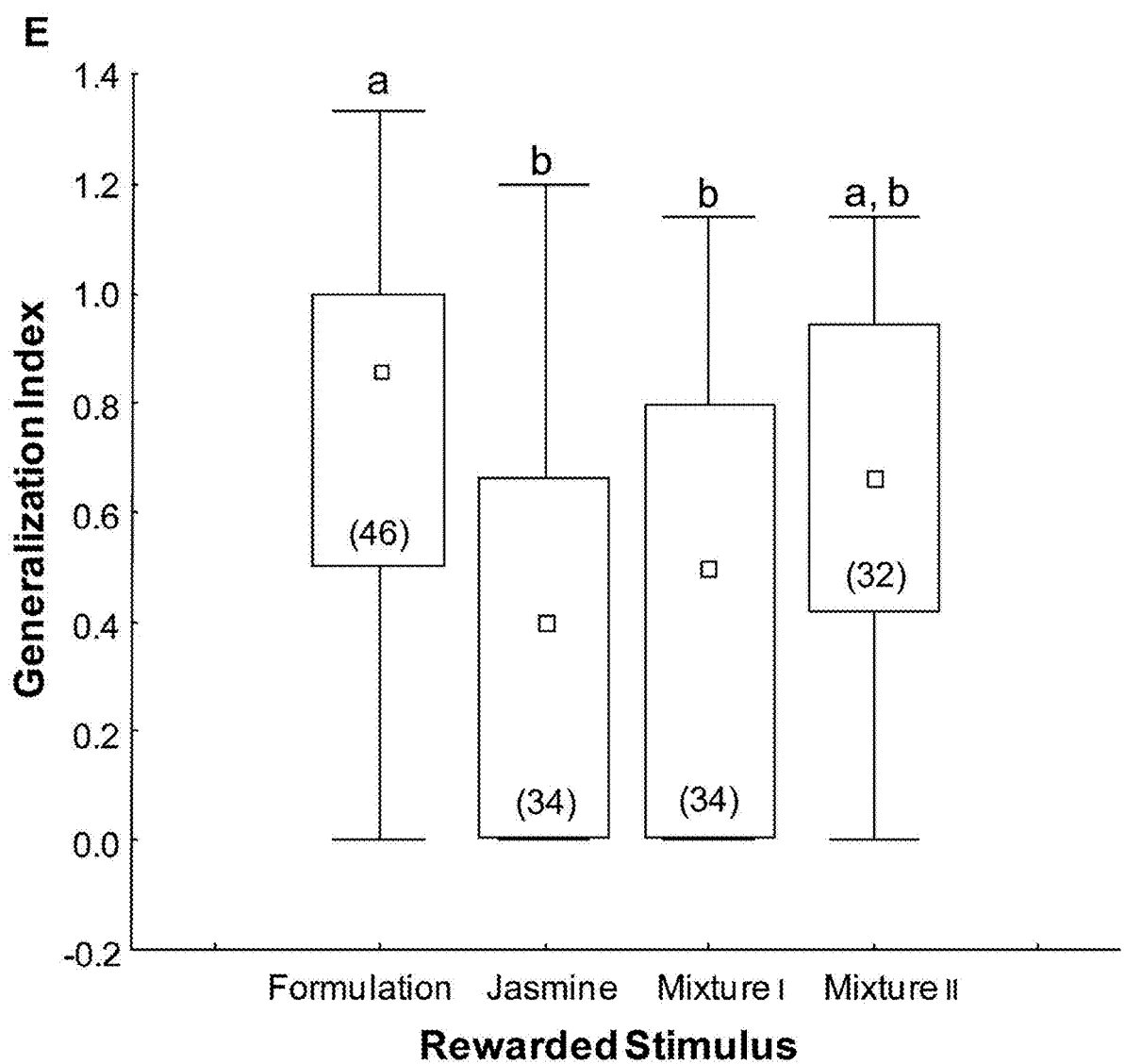
Figure 4:
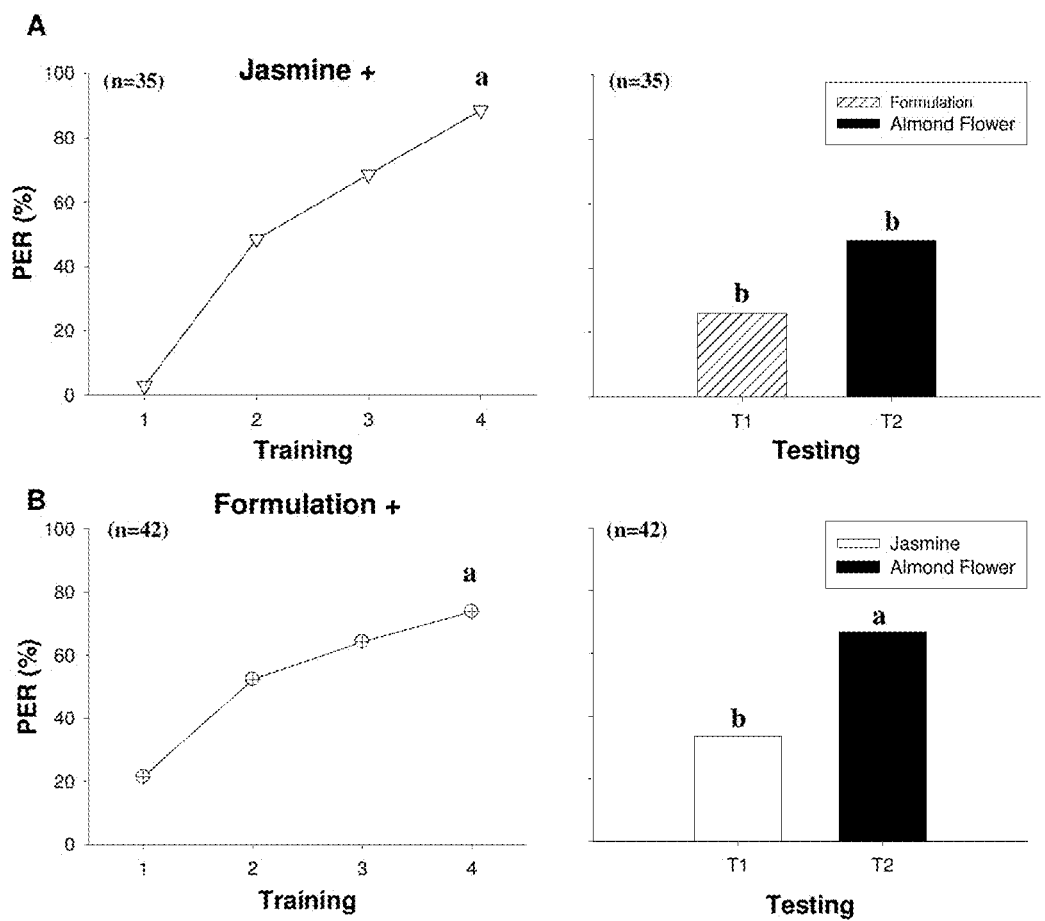
FIG. 4. Bees' ability to differentiate after Absolute Olfactory Conditioning of the proboscis extension response (PER) using: A, jasmine fragrance; and B, formulation of the invention. In both cases, the left panel contains the percentage of bees that extended their proboscis (% PER) during training, while the right panel contains the response to two odors (A, formulation and almond flower; B, jasmine and almond flower) after training.

By the end of the conditioning, the bees were able to differentiate the almond natural floral odor from every other evaluated scent, except for the Formulation (mixture 3 from Example 2). This was evident by comparing the generalization indexes that were calculated based on the bees performance in each assay (FIG. 3E).

Example 4: Evaluation of Formulations Through Absolute Olfactory Conditioning

An absolute olfactory conditioning was carried out to evaluate the bees' ability to differentiate the Formulation (mixture 3 from Example 2) from the almond natural floral odor. Harnessed bees were trained by being presented with synthetic jasmine scent (Pfeiffer-Gerhards Keramik—Germany) or Formulation (Mixture 3 from Example 2) (4 µl of each embedded in filter paper and introduced in a syringe), both in association with a reward. The stimulus was presented every 15 minutes, for a total of 4 presentations. At the end of the training, in Testing Phase, the bees were presented with two new scents: Almond natural floral odor (fresh flowers placed inside a Büchner flask) and Formulation (Mixture 3 from Example 2) for bees conditioned with synthetic jasmine scent, and almond natural floral odor and synthetic jasmine scent for bees conditioned with Formulation (Mixture 3 from Example 2), and the bees' proboscis extension response (PER) was evaluated. As it happened with the experiment described in Example 3, the bees conditioned with Formulation showed a similar learning performance to the one exhibited during the last training trial, suggesting that they could not differentiate Formulation from the almond natural floral odor.

Example 5: Beehive Stimulation

A composition was prepared by dissolving 50 µl of Formulation (Mixture 3 from Example 2) per 1000 ml of an aqueous sucrose solution 50% w/w. 20 beehives were fed by means of a single administration of 500 ml of the composition with the Formulation, while other 40 hives received 500 ml of sucrose solution 50% w/w (control). In both cases, the treatment was poured over the hive frames. Beehives were already placed in the almond crop with a blooming level below 5%. The hives were located in an almond (*Prunus dulcis*) crop near Lavalle (Mendoza Province, Argentina). The bees' activity was measured, as well as the bee density on almond flowers, the increase in the pollen area and in the brood of the beehives, up to 6 days after administering the treatment, when the blooming level had reached 60%. The yield of crops was also evaluated in terms of the number of fruits per tree and Kg per hectare.

Figure 5:
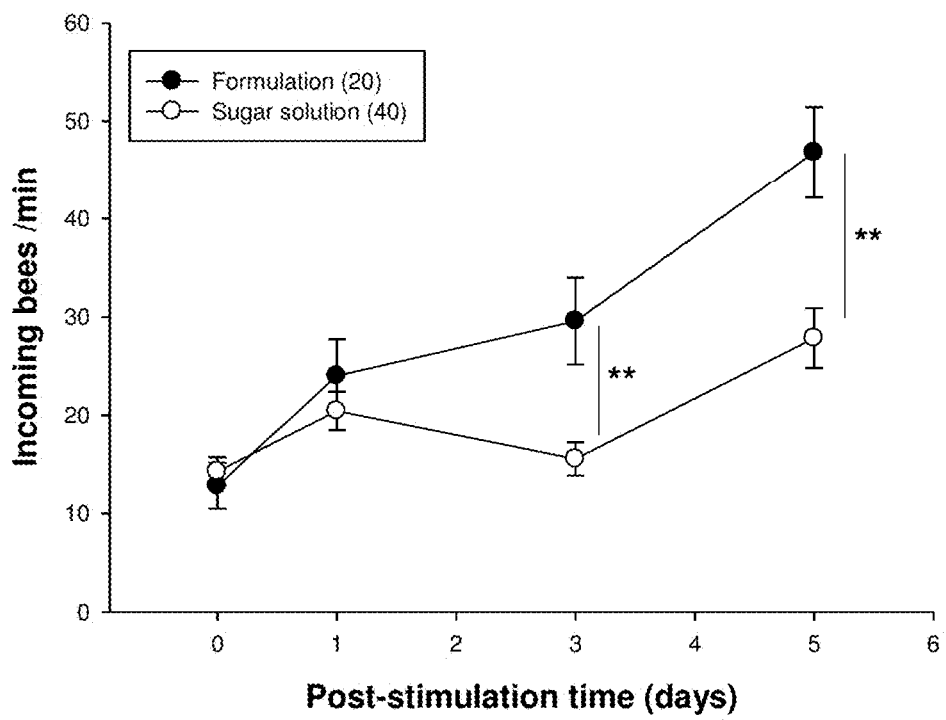
FIG. 5. Beehive activity in the almond tree crops (*Prunus dulcis*). The number of bees that enter the hive per minute was measured after feeding them with: (A) sucrose solution (control, white circles) and (B) Formulation of the invention (treatment, black circles). The number of beehives is indicated in brackets. Asterisks indicate significant differences, **, $p<0.01$ (GLM, minimum adequate model).

The beehives fed with the composition containing Formulation (Mixture 3 from Example 2) showed significantly higher level of activity than that showed by the control group (measured as number of incoming bees per minute). The difference between the activity of the stimulated beehives and the activity of the control group was noticeably greater during the $3^{rd}$ and $5^{th}$ day post-stimulation than during the $1^{st}$ day post-stimulation, when the hives of the experimental group only presented a slightly higher activity than that of the control group (FIG. 5).

Figure 6:
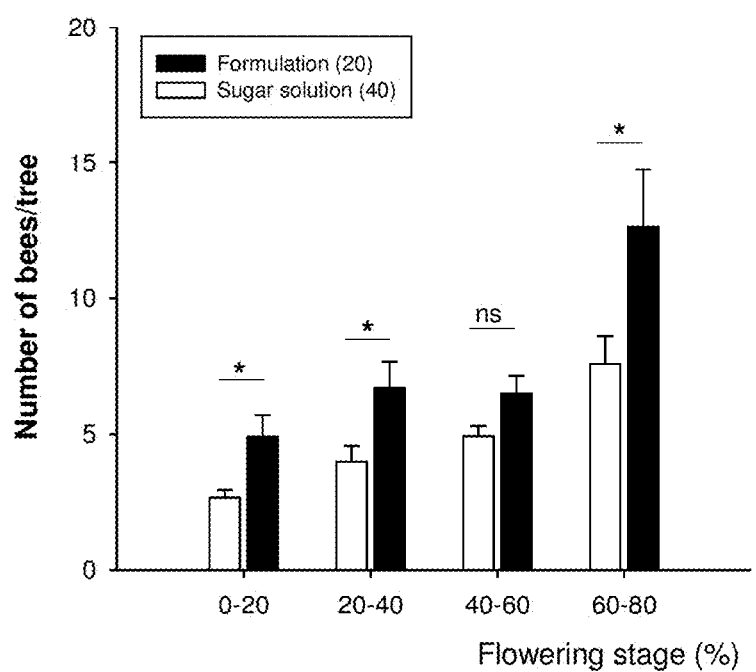
FIG. 6. Number of bees that visit the almond flowers. The density of bees present on the crop's flowers was quantified in the vicinity of the beehives subjected to two treatments: i) Control Group, hives fed with Sucrose Solution (white bars); ii) Treatment Group, hives fed with Sucrose Solution with the addition of Almond Formulation of the invention (Formulation, black bars). Number of bees per tree (mean±SE) vs the blooming percentage. The number of sampled trees is indicated in brackets, the asterisk indicates significant differences, *, $p<0.05$ (comparison between treatments, Mann-Whitney U-test).

Administering the sugar composition with Formulation also resulted in an increase in the number of bees visiting the almond tree crop flowers. As shown in FIG. 6, for every level of the blooming period, the bee density on the crop flowers in the vicinity of the treated hives was significantly higher than the bee density on the crop flowers in the vicinity of the control group.

Figure 7:
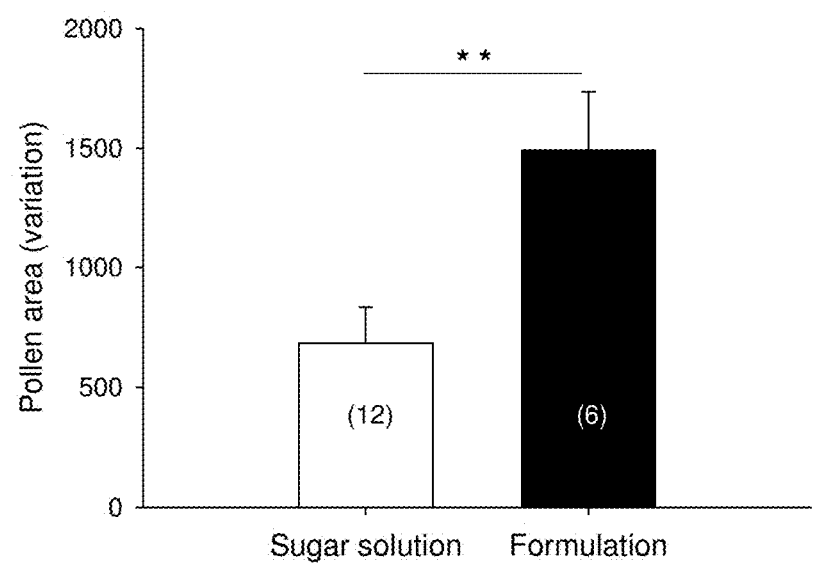
FIG. 7. Effect of the Almond Formulation of the invention on the amount of stored pollen. Increase in the total pollen area inside the beehives subjected to two treatments: i) Control Group, hives fed with Sucrose Solution (white bar); ii) Treatment Group, hives fed with Sucrose Solution with the addition of the Almond Formulation of the invention (Formulation, black bar). The variation shown is the difference between the area measured the day before applying the treatments and the area measured 8 days after. The number of hives is indicated in brackets. The asterisk indicates significant differences, **, $p<0.01$ (GLM, minimum adequate model).
Figure 8:
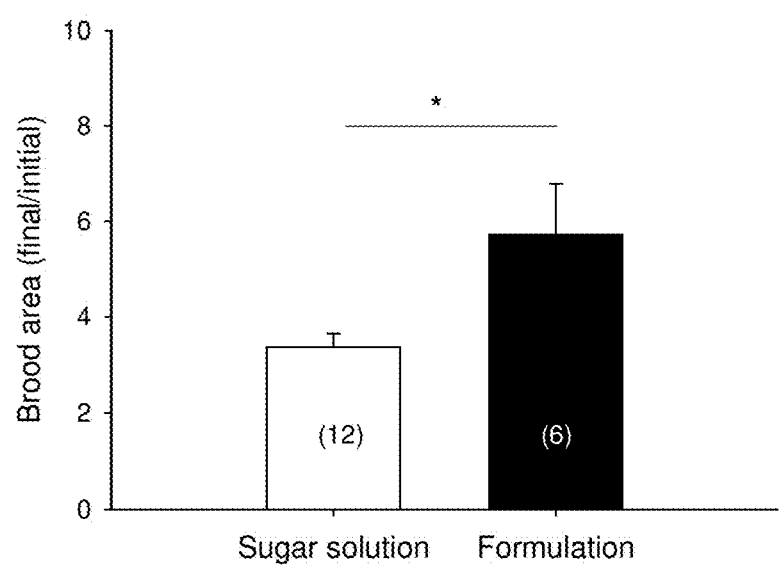
FIG. 8. The effect of the Almond Formulation of the invention on the beehive's population. The increased in the brood area inside the beehives subjected to two treatments: i) Control Group, hives fed with Sucrose Solution (white bar); ii) Treatment Group, hives fed with Sucrose Solution with the addition of the Almond Formulation of the invention (Formulation, black bar). The hives' total brood area was estimated based on the sum of the brood areas of both sides in every frame. The brood area represents the ratio of the final brood area (measured 8 days after) divided by the initial brood area (measured the day before stimulation). The number of hives is indicated in brackets. The asterisks indicates significant differences, *, $p<0.05$ (GLM, minimum adequate model).

The higher activity in bees from the treated hives was correlated with greater increases in the pollen area (FIG. 7), and in in the brood area (FIG. 8), showing that the sugar composition with Formulation promotes food collection and stimulates hive growth.

Figure 9:
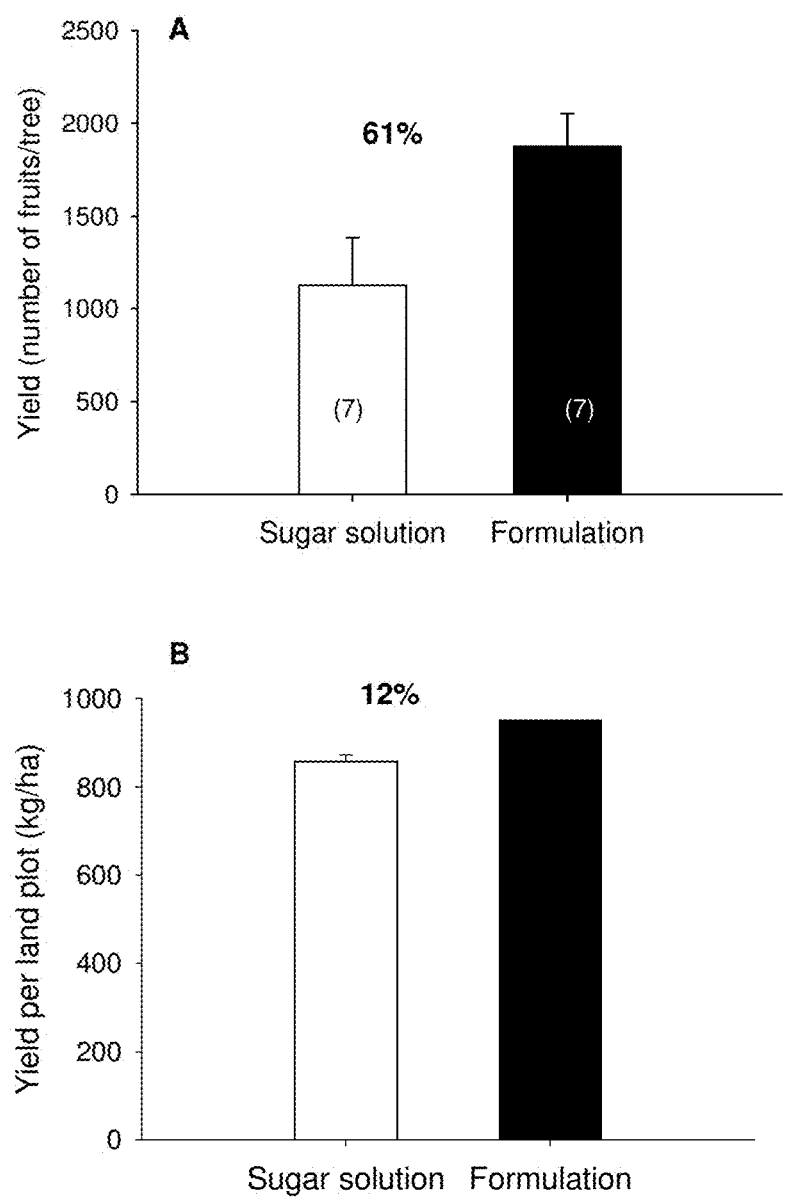
FIG. 9. Effect of the Almond Formulation of the invention on the crop yield. Crop yields measured in the direct vicinity of hives subjected to two treatments: i) Control Group, hives fed with Sucrose Solution (white bar); ii) Treatment Group, hives fed with Sucrose Solution with the addition of the Almond Formulation of the invention (Formulation, black bar). A) Fruit yield per tree. Number of sampled trees is indicated in brackets ($p<0.1$) (GLM, minimum adequate model). B) Yield (kg/ha).

Additionally, beneficial effects in the almond tree crops were confirmed. The almond tree crops in the vicinity of the beehives treated with the sugar composition with Formulation had higher yields, both when measured in terms of number of fruits per tree (FIG. 9A) as in terms of fruit weight per hectare (FIG. 9B).

The invention claimed is:

1. A formulation that promotes targeted pollination of almond tree crops by honey bees, wherein the formulation comprises 49.5% to 60.5% limonene, 25% to 35% linalool and 10% to 20% benzaldehyde.

2. The formulation according to claim 1, wherein the formulation comprises 50% to 60% limonene, 27% to 33% linalool and 13.5% to 16.5% benzaldehyde.

3. The formulation according to claim 1, wherein the formulation comprises 55% limonene, 30% linalool and 15% benzaldehyde.

4. A composition that promotes targeted pollination of almond tree crops by honey bees, wherein the composition comprises 49.5% to 60.5% limonene, 25% to 35% linalool and 10% to 20% benzaldehyde, diluted in a sugar solution.

5. The composition according to claim 4, wherein the sugar solution is an aqueous sucrose solution.

6. The composition according to claim 5, wherein the aqueous sucrose solution is a 50% w/w aqueous sucrose solution.

7. The composition according to claim 4, wherein the composition comprises 0.1 ml to 0.2 ml of the formulation comprising 49.5% to 60.5% limonene, 25% to 35% linalool and 10% to 20% benzaldehyde, per 1 L of a 50% w/w aqueous sucrose solution.

8. The composition according to claim 4, wherein the composition comprises 0.1 ml to 0.2 ml of a formulation comprising 50% to 60% limonene, 27% to 33% linalool and 13.5% to 16.5% benzaldehyde, per 1 L of a 50% w/w aqueous sucrose solution.

9. A method for promoting targeted pollination of almond tree crops by honey bees, wherein the method comprises the steps of:
   a) administering to honey bee hives a composition that comprises a formulation comprising 49.5% to 60.5% limonene, 25% to 35% linalool and 10% to 20% benzaldehyde;
   b) keeping the hives until the end of the blooming within or in the immediate vicinity of the almond tree crops, the pollination of which is sought to be promoted; and
   c) removing the hives.

10. The method according to claim 9, wherein step a) is carried out through an artificial feeder located inside the hives.

11. The method according to claim 9, wherein step a) is carried out within 2 days before taking the hives to the crops, the pollination of which is sought to be promoted.

12. The method according to claim 9, wherein step a) is carried out after placing the hives in the target crops, the pollination of which is sought to be promoted.

13. The method according to claim 11, wherein step a) is further carried out before the crops' blooming level reaches 20%.

14. The method according to claim 9, wherein during step b) a second administration of the composition to the hives is carried out.

15. The method according to claim 9, wherein in step a) the formulation comprises 50% to 60% limonene, 27% to 33% linalool and 13.5% to 16.5% benzaldehyde.

16. The method according to claim 15, wherein the formulation comprises 55% limonene, 30% linalool and 15% benzaldehyde.

* * * * *